(12) United States Patent
Vinogradov et al.

(10) Patent No.: US 10,739,314 B2
(45) Date of Patent: Aug. 11, 2020

(54) OMNI-DIRECTIONAL GUIDED WAVE TESTING OF PLATE STRUCTURES USING PROBE HAVING ROTATING GUIDED WAVE SENSOR

(71) Applicant: Southwest Research Institute, San Antonio, TX (US)

(72) Inventors: Sergey A. Vinogradov, San Antonio, TX (US); Adam C. Cobb, San Antonio, TX (US); Jonathan D. Bartlett, San Antonio, TX (US); Greg A. Bustamante, San Antonio, TX (US); Douglas R. Earnest, San Antonio, TX (US); Clinton J. Thwing, Bulverde, TX (US)

(73) Assignee: Southwest Research Institute, San Antonio, TX (US)

( * ) Notice: Subject to any disclaimer, the term of this patent is extended or adjusted under 35 U.S.C. 154(b) by 148 days.

(21) Appl. No.: 15/845,497

(22) Filed: Dec. 18, 2017

(65) Prior Publication Data

US 2019/0187104 A1 Jun. 20, 2019

(51) Int. Cl.
*G01N 29/24* (2006.01)
*G01N 29/04* (2006.01)
*G01N 29/28* (2006.01)
*G01N 29/265* (2006.01)

(52) U.S. Cl.
CPC ......... *G01N 29/2431* (2013.01); *G01N 29/04* (2013.01); *G01N 29/043* (2013.01); *G01N 29/2412* (2013.01); *G01N 29/265* (2013.01); *G01N 29/28* (2013.01); *G01N 2291/044* (2013.01); *G01N 2291/0425* (2013.01)

(58) Field of Classification Search
CPC .. G01N 29/2431; G01N 29/04; G01N 29/043; G01N 29/2412; G01N 29/265; G01N 29/28; G01N 2291/0425; G01N 2291/044
USPC .......................................................... 73/644
See application file for complete search history.

(56) References Cited

U.S. PATENT DOCUMENTS

| | | | | | |
|---|---|---|---|---|---|
| 3,918,295 | A | * | 11/1975 | Herbertz | G01N 29/2412 73/613 |
| 5,456,113 | A | * | 10/1995 | Kwun | G01N 29/14 73/587 |
| 5,457,994 | A | * | 10/1995 | Kwun | G01N 29/14 73/587 |
| 2010/0052669 | A1 | * | 3/2010 | Kwun | G01N 29/043 324/240 |
| 2010/0321009 | A1 | * | 12/2010 | Lee | G01M 5/0033 324/209 |

(Continued)

FOREIGN PATENT DOCUMENTS

GB 1255870 A * 12/1971 ......... G01N 29/0636

*Primary Examiner* — Peter J Macchiarolo
*Assistant Examiner* — Monica S Young
(74) *Attorney, Agent, or Firm* — Livingston Law Firm

(57) ABSTRACT

A guided wave probe for use in guided wave testing of plate structures. The probe comprises a cup having a flat or nearly flat bottom, and a guided wave sensor, such as a magnetostrictive sensor, placed in the bottom of the cup. The sensor and/or cup are coupled to the plate structure, such that ultrasonic energy from the sensor is transmitted to the cup and the plate surface. The sensor is incrementally rotated in the cup, and sensor data is acquired at each incremental position.

8 Claims, 6 Drawing Sheets

(56) References Cited

U.S. PATENT DOCUMENTS

| | | | |
|---|---|---|---|
| 2011/0169486 A1* | 7/2011 | Light | G01N 29/2412 |
| | | | 324/240 |
| 2012/0089026 A1* | 4/2012 | Wang | A61B 8/0825 |
| | | | 600/443 |
| 2013/0069639 A1* | 3/2013 | Cobb | G01R 33/18 |
| | | | 324/209 |
| 2014/0246954 A1* | 9/2014 | Kwon | G01N 29/2462 |
| | | | 310/334 |
| 2014/0283612 A1* | 9/2014 | Williams | G01N 29/24 |
| | | | 73/633 |
| 2014/0312888 A1* | 10/2014 | Vinogradov | G01N 29/2412 |
| | | | 324/240 |
| 2014/0354388 A1* | 12/2014 | Kim | H01L 41/12 |
| | | | 336/110 |
| 2017/0115204 A1* | 4/2017 | Vinogradov | G01N 27/82 |

* cited by examiner

OMNI-DIRECTIONAL GUIDED WAVE TESTING OF PLATE STRUCTURES USING PROBE HAVING ROTATING GUIDED WAVE SENSOR

TECHNICAL FIELD OF THE INVENTION

This invention relates to nondestructive testing using guided wave testing (GWT), and more particularly, to testing plate structures with guided waves from a probe having a rotating guided wave sensor.

BACKGROUND OF THE INVENTION

One effective method for inspecting and monitoring various structures is guided wave testing (GWT) using magnetostrictive sensor (MsS) technology. The principle of magnetostriction is based on either shifting or oscillation/rotation between magnetic domains in the material due to applied magnetic fields. Typically, a permanent magnetic field is used to give the domains a preferred orientation. Variable magnetic fields are also applied to initiate the rotation of the domains causing the dimensional changes. Depending on the mutual orientation (in-plane or out-of-plane) and on the mutual magnitude of the magnetic fields, oscillation of domains can produce longitudinal or transverse vibrations.

There are many applications of MsS testing, with testing of plate structures being a common application. Examples of industries having a need for testing large plates welded together are refineries, chemical plants, and electric power generation plants.

For guided waves testing of plates, a plate type of Mss sensor can be used, herein referred to as a "MsS plate sensor". However, with conventional MsS plate sensors, a series of incremental movement of the sensor across the surface of the plate is required to cover the large surface.

To maximize coverage of MsS plate sensors, directional sensors have been developed. U.S. patent application Ser. No. 15/376,049, to Vinogradov, et al., entitled "Non Destructive Magnetostrictive Testing with Unidirectional Guided Waves Generated by Ferromagnetic Strip Sensor" describes various embodiments of a directional MsS sensor. A number of unidirectional MsS sensors are arranged in a circular configuration, which is placed on the plate to be tested. Each MsS sensor tests a segment of the plate.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

The following description is directed to non destructive testing of plate structures using special magnetostrictive sensor (MsS) probes. The MsS probes described herein are omnidirectional, designed to test a large area of a plate without changing the probe's position. These probes contain one or more rotating MsS sensors, which are rotated above a plate structure, behind a protective cup. The probe provides omnidirectional coverage without losing the efficiency of acoustic coupling.

Although the terms "MsS probe", "MsS sensor" and "MsS transducer" are sometimes used interchangeably, for purposes of this description, "MsS sensor" refers to the coil/strip/magnet elements that send and receive the MsS guided waves. The "MsS probe" refers to the assembly comprising the rotating MsS sensor and other elements.

The "plate structures" referred to herein as the subject of MsS testing may be any large flat surface or large cylindrical shells, such as large diameter pipes, whose surface is nearly flat. Typically, as described in the Background, these structures are welded plates, but the MsS probe described herein is useful for any flat or nearly flat surface.

Although the following description is in terms of a rotating guided wave sensor that is an MsS sensor, the same concept of rotating a guided wave sensor applies to other types of guided wave sensors. Examples are piezoelectric or Lorentz-force guided wave sensors.

MsS Sensors for Inspection of Plate Structures

Various configurations of MsS plate sensors for testing plate structures have been developed. In general, each type of MsS sensor relies on excitation of transversal vibrations in a magnetostrictive strip. The strip is "magnetostrictive" because magnetostriction is a property of ferromagnetic materials that causes them to change their shape or dimensions during the process of magnetization. Excitation of transversal vibrations in the strip requires two mutually perpendicular magnetic fields to be applied to the strip with one of these fields being time-varying.

Figure 1:
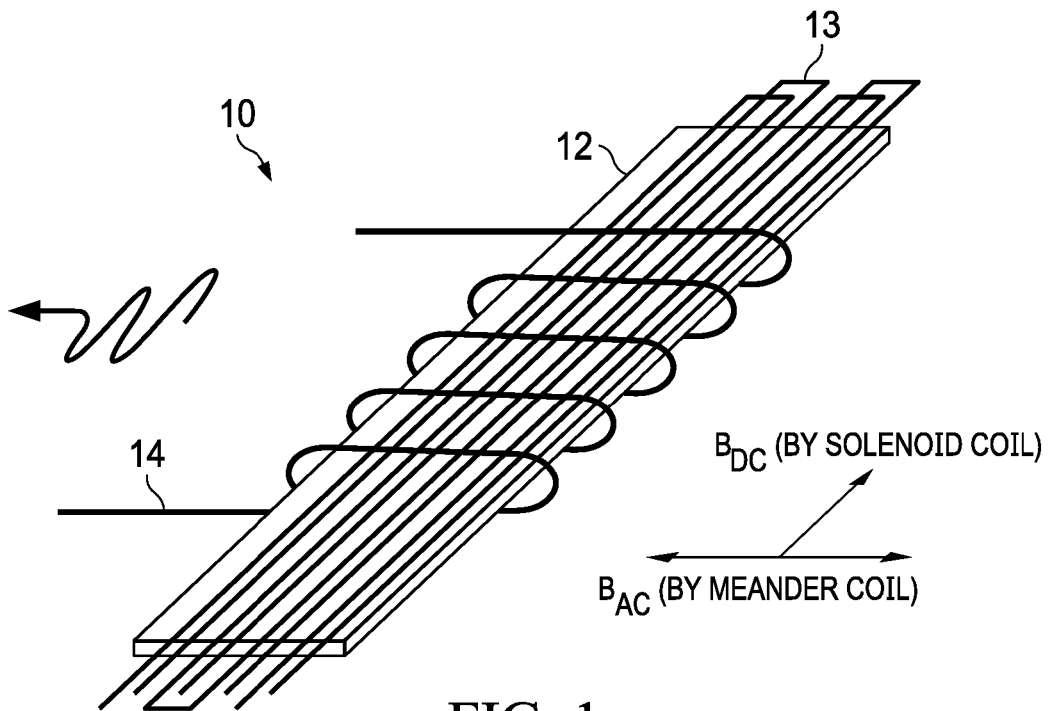
FIG. 1 illustrates a direct Wiedermann effect MsS plate sensor.
Figure 2:
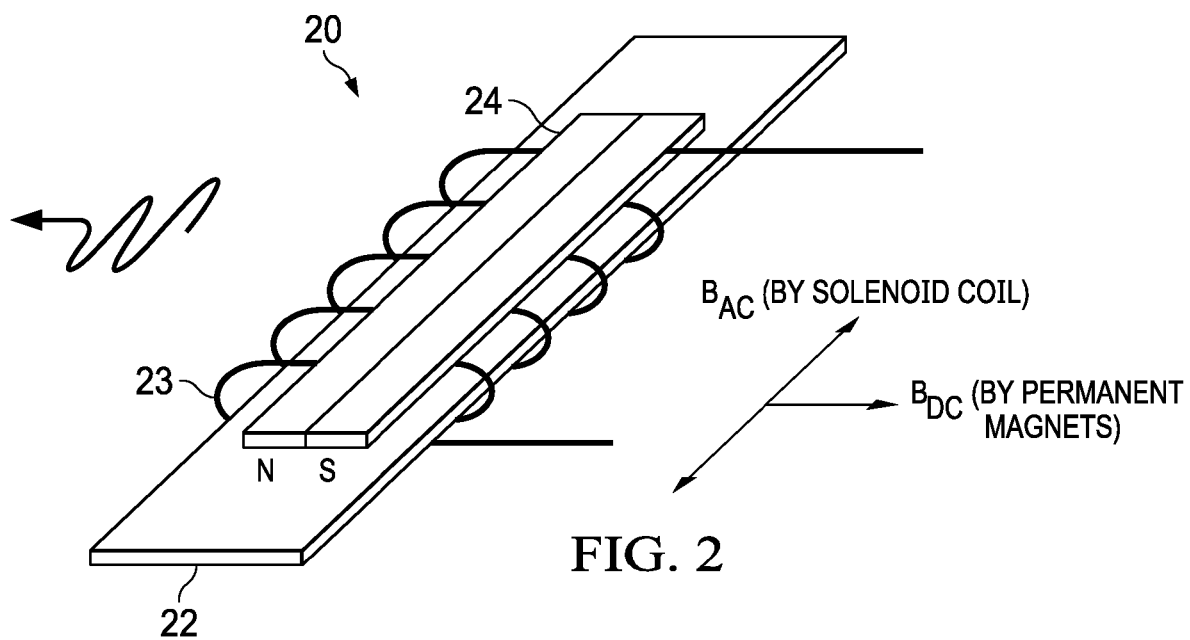
FIG. 2 illustrates a reverse Wiedermann effect MsS plate sensor.

FIGS. 1 and 2 illustrate two implementations of MsS sensors for plate structures. In FIG. 1, MsS sensor 10 has a permanent magnetic field that is perpendicular to a torsional (SH0) the guided wave propagation direction. In FIG. 2, MsS sensor 20 has a permanent magnetic field that is parallel to the guided wave propagation direction.

Referring to FIG. 1, MsS sensor 10 has meander coils 13 along the length of a magnetostrictive strip 12. When activated with an alternating current (AC), coils 13 provide an AC excitation magnetic field in a direction perpendicular to the strip 12. A solenoid coil 14 is wrapped around the short dimension of the strip 12. Coil 14 provides the DC magnetic field in the lengthwise direction of strip 12. Thus, sensor 10 uses the meander coils 13 to produce time-varying magnetic fields, in combination with the solenoidal coil 14 that supports a permanent magnetic bias.

In operation, DC coil 14 is energized with a power supply providing a direct current. Alternatively, strip 12 could be magnetized with a permanent magnet to eliminate the need for a DC power supply.

The configuration of MsS sensor 10, where the permanent magnetic field is perpendicular to the torsional guided wave propagation, is referred to a providing a "direct Wiedermann effect". MsS sensors of this type can deliver a high SNR and torsional mode generation in a wide frequency range of 16-250+ kHz.

Referring to FIG. 2, MsS sensor 20 has a solenoidal coil 23 wrapped around the width of magnetostrictive strip 22. Coil 23 provides the AC excitation and time-varying magnetic field. A permanent magnet 24 is polarized in the same direction as the windings of coil 23.

MsS sensor 20 uses a "reverse Wiedemann effect". Its permanent magnetic biasing and time-varying magnetization directions are reversed, as compared to MsS sensor 10.

In MsS sensor 20, the permanent magnetic biasing dimension is relatively short, which makes it easier to use rare earth magnets to induce consistent bias fields even if the transducer is as large as a few meters in length. Compared to sensor 10, sensor 20 has a lower impedance AC coil for providing the time-varying magnetic field, which allows for the use of simpler electronics, reducing power requirements and increasing signal strength. AC coil 23 is efficient in supporting high magnitude magnetic fields in wide frequency ranges. High efficiency in lower frequency range (below 30 kHz) makes sensor 20 suitable for long range testing of plates with thicknesses up to 76 mm using a non-dispersive SH0 mode.

MsS plate sensors similar to sensor 10 are described in U.S. Pat. No. 6,294,912 entitled "Method and Apparatus for Non-Destructive Inspection of Plate Type Ferromagnetic Structures Using Magnetostrictive Techniques", and in U.S. Pat. No. 6,396,262 entitled "Method and Apparatus for Short Term Inspection or Long Term Structural Health Monitoring". MsS plate sensors similar to sensor 20 are described in U.S. patent application Ser. No. 15/376,049, entitled "Non Destructive Magnetostrictive Testing with Uni-Directional Guided Waves Generated by Magnetostrictive Strip Sensor", and in U.S. Pat. No. 7,821,258 entitled "Method and System for Generating and Receiving Torsional Guided Waves in a Structure". Each of these disclosures are incorporated herein in its entirety by reference.

Figure 3:
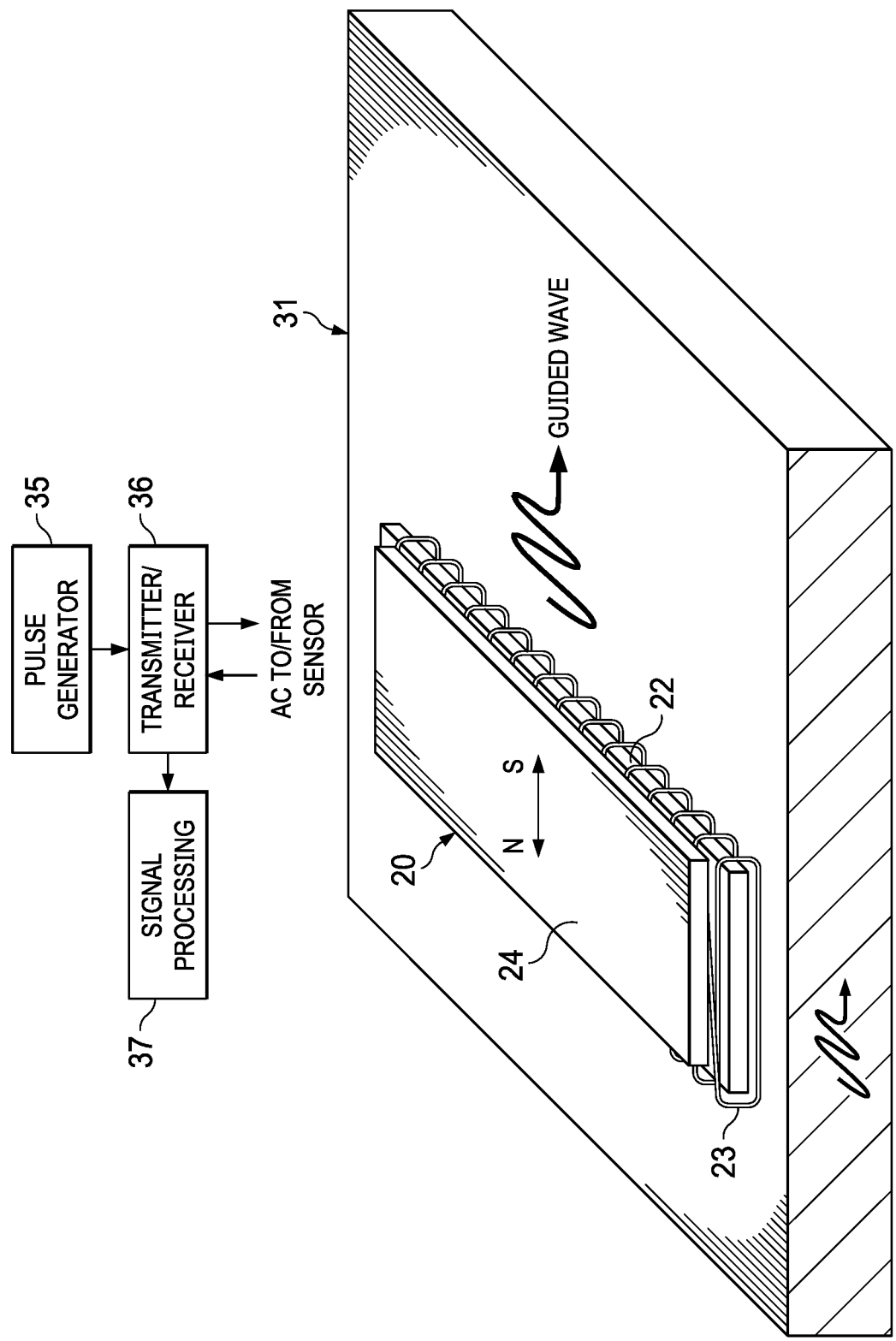
FIG. 3 illustrates an MsS plate sensor system.

FIG. 3 illustrates an MsS plate sensor in use for testing a plate 31. For purposes of example, an MsS sensor 20 of the type described in connection with FIG. 2 is illustrated, but the same principles apply to other MsS plate sensors.

As described above, MsS sensor 20 comprises a magnetostrictive strip 22, with an AC coil 23 wrapped around its short dimension (width). A permanent magnet 24 is located with its poles parallel to coil windings. Although not shown, a coating layer may be used to protect the contacting surface of sensor 20. In operation, magnet 24 creates a permanent DC bias magnetic field. The AC coil 23 generates an alternating field that is perpendicular to the DC bias magnetic field.

The direction of the permanent magnetic bias field as well as the orientation of the windings of the AC coil 23 are parallel to the direction of propagation of transversal vibration. The poles of the magnet are located on the sides of the coil to create in-plane magnetization only. This helps to eliminate any longitudinal modes by making domains oscillate in-plane only. When a pulsed alternating current flows through AC coil 23, a torsional guided wave (TGW) propagates in plate 31 in the direction indicated.

In a completed system, with a pulse generator 15 creating an AC pulse that is delivered through transmitter/receiver 16 to AC coil 13, an impulse of alternating current is created in AC coil 13. This impulse of alternating current creates an alternating magnetic bias in magnetostrictive strip 12, which in turn causes the torsional guided waves to propagate in the direction indicated.

If there is a defect in structure 31, a reflected torsional guided wave will be reflected towards the magnetostrictive strip 22. The magnetostrictive strip 22 will respond with what is known as the Matteucci effect, which will cause an electrical impulse in AC coil 23. The reflected torsional guided wave signal detected in AC coil 23 is received by transmitter/receiver 16 and delivered to signal processor 17, which analyzes the signal to locate and estimate the size of the defect.

In variations of sensor 20, the permanent magnet 24 can be divided into a series of smaller magnets located along the magnetostrictive strip 22 to ensure that the magnetostrictive strip 22 is well magnetized. Also, the AC coil 23 could be split into a set of coils connected in either parallel or series arrangement for better performance.

Unidirectional MsS Sensors

U.S. patent application Ser. No. 15/376,049, referenced above, further describes how MsS sensors can be used to produce the effect of unidirectional guided wave propagation. As described therein, one approach uses two MsS sensors with fixed spacing between them. Another approach uses a single MsS sensor with partial magnetization.

Figure 4:
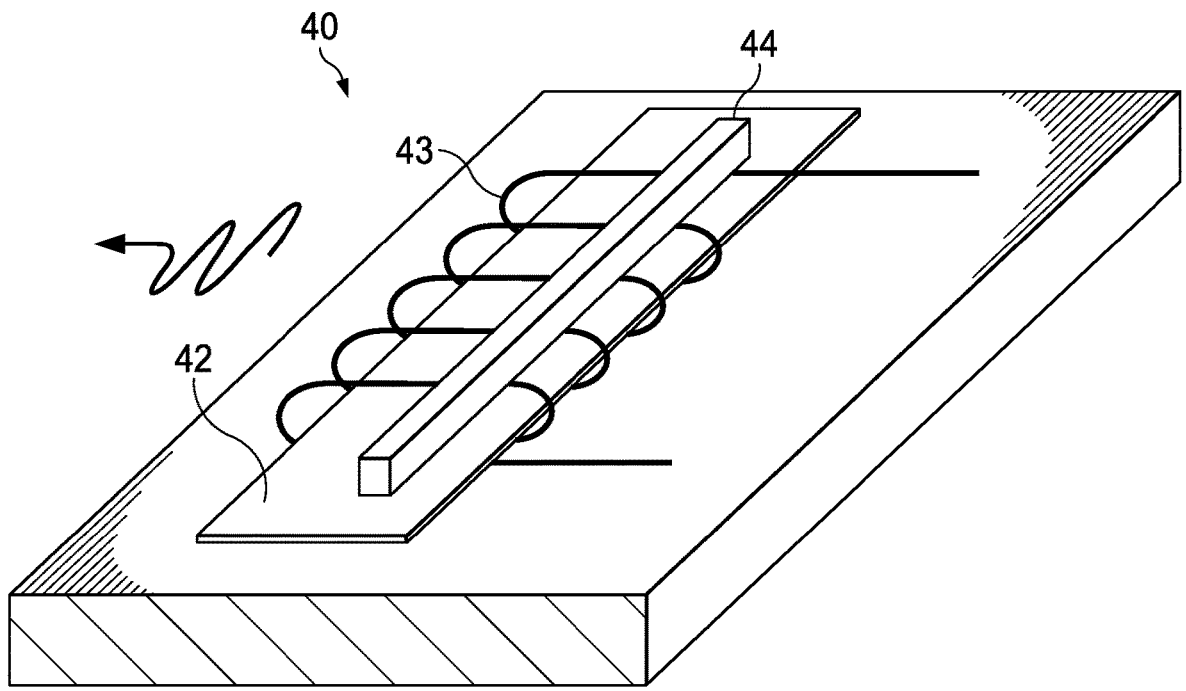
FIG. 4 illustrates an MsS plate sensor for uni-directional guided wave testing.

FIG. 4 illustrates an MsS plate sensor 40 with partial magnetization. It is similar to sensor 20, having a magnetostrictive strip 42, toroidal AC coil 43, and permanent magnet 44. However, magnet 44 only partially magnetizes strip 52.

Figure 5:
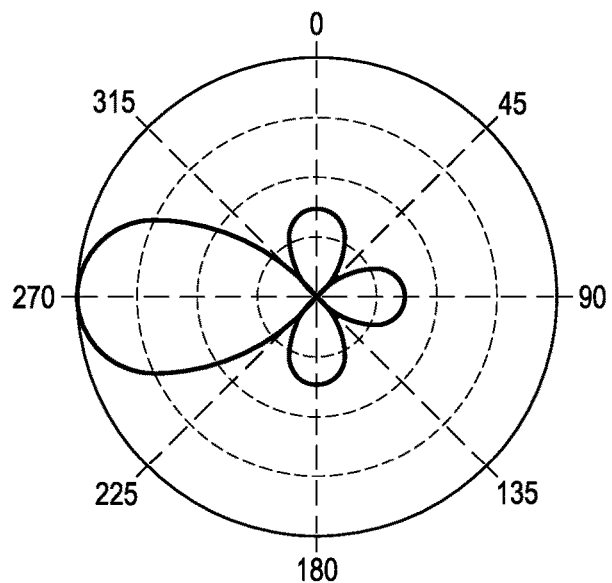
FIG. 5 illustrates the uni-directional wave pattern produced by the sensor of FIG. 4.

FIG. 5 illustrates the unidirectional pattern of guided wave propagation produced by sensor 40. Partial strip magnetization allows generation of unidirectional guided waves in a wide frequency range of 150-500 kHz. This use of a single MsS sensor for unidirectional guided waves is advantageous over the conventional method of using two sensors. Sensor 40 is particularly suited for use with the omnidirectional MsS probe described below.

Omni-Directional Testing Using Rotating Sensor

Figure 6:
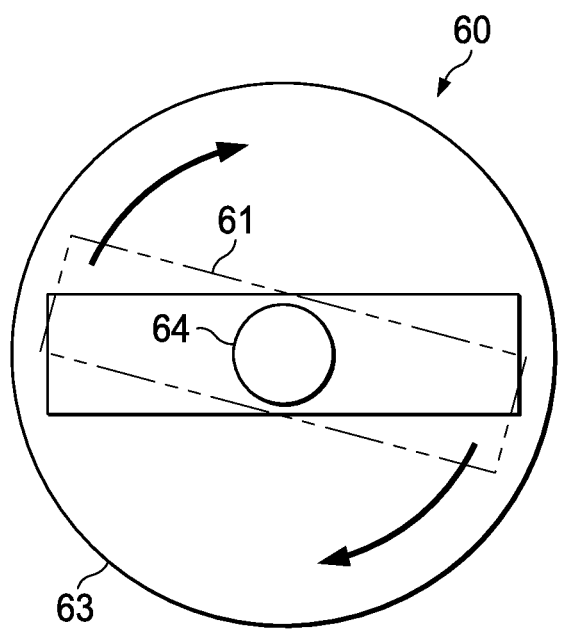
FIG. 6 illustrates a first embodiment of a rotating MsS plate sensor.
Figure 7:
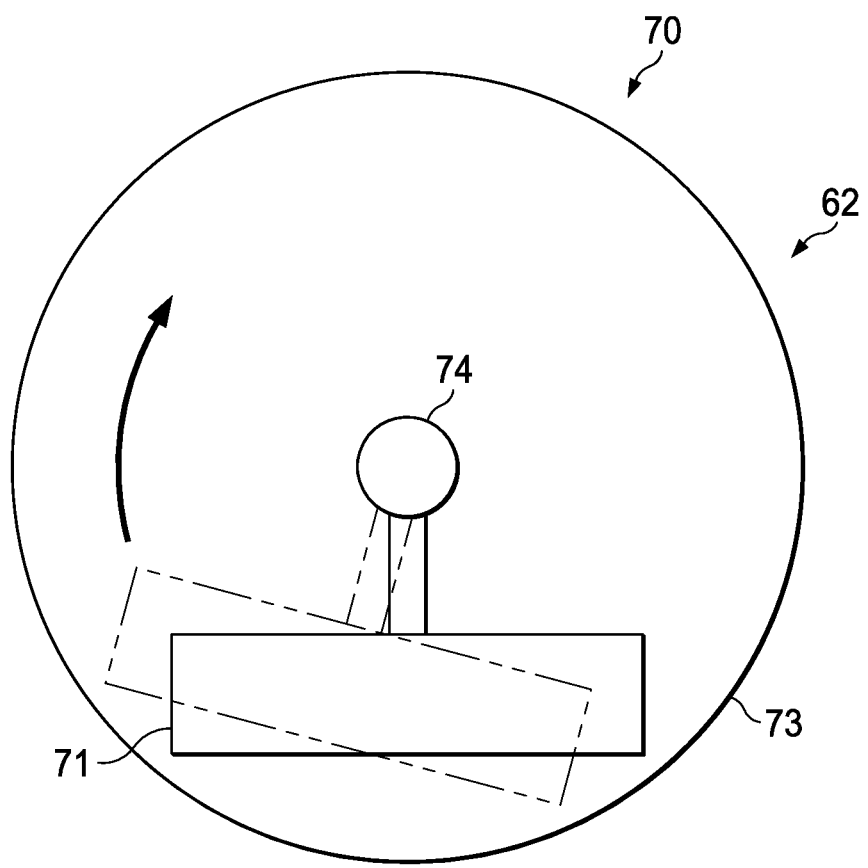
FIG. 7 illustrates a second embodiment of a rotating MsS plate sensor.

FIGS. 6 and 7 illustrate the principle of operation of rotating a guided wave sensor to provide omni-directional coverage of a test structure. As stated above, this description is in terms of MsS sensors, but the same concepts apply to other guided wave sensors.

Probes 60 and 70 are illustrated as top views, each having an MsS sensor 61 or 71, placed in a cup 63 or 73, and looking downward to a surface upon which probe 60 or 70 is placed. Probe 60 or 70 may be any one of the various MsS probes described above, or others.

With each probe, the sensor 61 or 71 is moved in an incremental step by step rotation, with data collection following each step. As illustrated in FIG. 6, the sensor 61 can be rotated by a shaft 64 attached to the middle section of the sensor 60. Alternatively, as illustrated in FIG. 7, the sensor 71 can be offset from the center of a shaft 74.

Because transduction of the guided wave is performed only one direction at each angular probe position, the plate structure acts as a waveguide with predominantly a single dimension. In other words, the beam spread can be neglected compared to the propagation distance.

Omni-Directional Probe Implementation

Using a rotating MsS sensor on a plate structure presents two major problems—maintaining constant acoustic coupling and protecting the sensor from damage. The probes described below address both problems.

Figure 8:
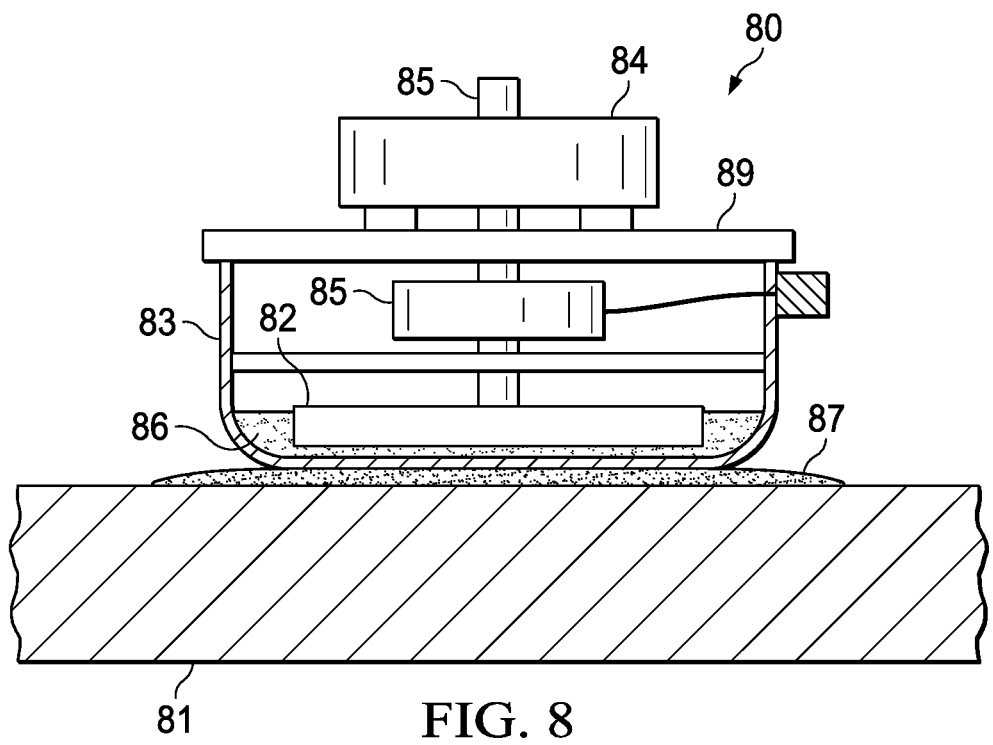
FIG. 8 illustrates a first embodiment of an MsS probe that houses and actuates a rotating MsS plate sensor.

FIG. 8 illustrates a first embodiment of an MsS probe 80 having a rotating MsS sensor 82, and placed on a plate 81 for testing. MsS sensor 82 may be any of the MsS plate sensors described above.

A thin-wall metal cup 83 is disposed between the probe 82 and the plate 81. Cup 83 has a flat bottom and raised sides, and has an inner circumference sufficiently large to allow sensor 82 to rotate within cup 83.

Rotation of sensor 82 within cup 83 is accomplished with a servo motor 84 and shaft 85. The shaft 85 may be attached to sensor 81 in either of the configurations described above in connection with FIGS. 6 and 7. A slipping connector 85 provides an electrical connection for operating sensor 82. A top plate 89 may be used to enclose sensor 82, connector 85, and optionally motor 84.

Probe 80 has two layers of shear wave couplant. A first layer 86 is between sensor 82 and cup 83. A second layer 87 is between cup 83 and plate 81. Couplant layer 86 allows for attachment of sensor 82 on top of the internal surface of the cup 83, and also provides a high quality acoustic coupling of ultrasonic energy to the plate 81.

In addition to holding couplant layer 86, cup 83 serves as a shield protecting the moving parts of the probe 80. In particular, cup 83, filled with shear wave couplant layer 86, protects sensor 82 from rubbing and mechanical impact, such as abrasive tear and wear over the test surface of tested component.

Coupling of cup 83 to the tested structure is provided by layer 87 of shear wave couplant applied to the test surface. As a result, the energy transmission from the MsS probe 80 to the test structure is conducted past two layers of shear wave couplant and a one layer of metal. A number of experimental tests have revealed high transduction efficiency of the probe 80 through metal cups made of aluminum, stainless steel and titanium in a wide frequency range (30-400 kHz). Alternatively, cup 83 could be made of a composite material, such as fiberglass, high density polyethylene, or urethane.

Because shear wave couplant allows slipping with a substantial force applied to the shaft 85, a high torque serve motor 84 with gearing may be used and allows smooth rotation of the probe.

An example of a suitable couplant is a 13% water content decomposed sugar at room temperature. Probe 80 could be used at lower temperature if a heating wire were applied to control the temperature of the couplant.

As stated above, probe 80 can use various types of MsS sensors 82, including sensors 10 or 20 or 40, and other types of dual directional or uni-directional MsS sensors. Also, MsS sensors configured to generate longitudinal mode guided waves can be used. This can be accomplished by using a sensor having a magnetostrictive strip, a meander coil as shown in FIG. 1 and bias magnets with the orientation shown in FIG. 2.

Figure 9:
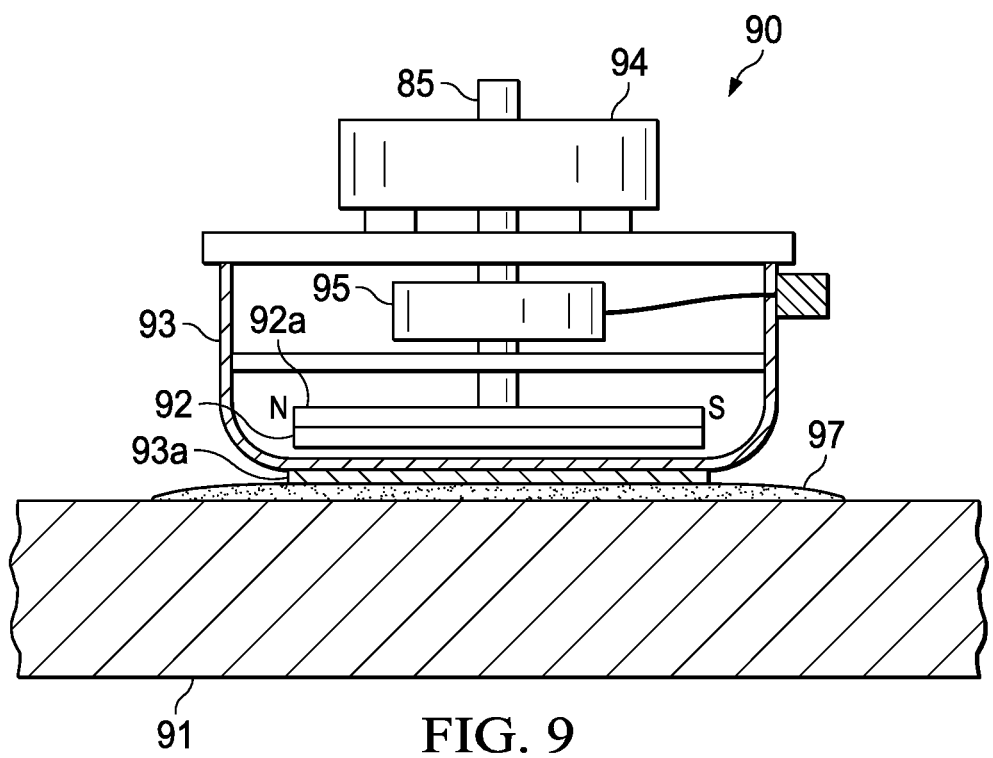
FIG. 9 illustrates a second embodiment of an MsS probe that houses and actuates a rotating MsS plate sensor.

FIG. 9 illustrates a second embodiment of an MsS probe 90 having a rotating MsS sensor 92, and placed on a plate 91 for testing. MsS sensor 92 is similar to the sensor 10 of FIG. 1, having a strip and meander coil, but instead of a solenoid coil providing the magnetic bias along the long direction of a magnetostrictive strip, the bias is provided using a permanent magnet 92a placed on top of the AC coil of sensor 92.

In a manner similar to probe 80, probe 90 has a thin-wall cup 93 containing sensor 92, and whose bottom surface is disposed between the sensor 92 and the plate 91. On the bottom of cup 93, a magnetostrictive patch 93a is attached, which interfaces the bottom of cup 93 and a couplant layer 97. Generation of transversal vibrations in patch 93a is accomplished via the electro-magnetic acoustic transducer (EMAT) principle. Patch 93a is re-magnetized as sensor 90, with its meander coil, rotates. Alternatively, a magnetostrictive patch could be attached to the tested structure, and used under probe 90.

Probe 90 uses only one couplant layer 97. This makes probe 90 particularly suitable for testing of structures having elevated temperature.

However, as compared to probe 80, the MsS sensor 92 of probe 90 has a more limited length (75 to 100 mm or 3-4 inches) due to the need to use a long permanent magnet 92a. Also, the selection of material for the magnetostrictive patch 93a may be limited to material with isotropic magnetic properties such as nickel. This embodiment of FIG. 9 is useful for test surfaces that are themselves magnetostrictive, as well as test surfaces that are not.

Patch 93a may be eliminated if the plate surface being tested is itself a magnetostrictive material. In this case, vibrations are generated directly from sensor 92 to test material 91. This embodiment eliminates the need for coupling materials. Cup 93 is made from a material having low conductivity, such as titanium.

As indicated above, the temperature of the test structure may affect use of probe 80 or 90 due to couplant limitations. A few brands of shear wave couplant are commercially available with upper temperature limits of about 32 degrees C. The decomposed sugar mix referred to above, has an upper temperature limit of about 45 degrees C. For testing plate structures having surface temperature up to 100 degrees C., special waxes with melting point around 65 degrees C. can be used as a couplant. Built-in heaters in the probe can be used to maintain consistent temperature and viscosity of the couplant.

For high temperature applications, probe 90 may be more suitable for surfaces with temperatures up to 300 degrees C. Coupling layer 97 in this case could be replaced by a high temperature epoxy. Also, the incremental rotating motion could be supported by a stepper motor or other actuator 94 suitable for operation at elevated temperatures, such as motors uses magnetostrictive forces.

Referring again to FIG. 8, a prototype version of probe 80 having a 5 inch diameter cup 83 with a wall thickness of 0.5 mm was used for experimentation. Sensor 82 had a 5 inch aperture. Smaller (as short as 1.5 inches) aperture probes might be more convenient when a shorter inspection range is needed. Probes with aperture up to 6 inches could provide a longer range of coverage with good SNR.

Experimentation with this prototype probe on a 12.7 mm walled carbon steel mockup at 60 kHz revealed its capability to detect a large variety of anomalies at a distance up to 3.5 meters from the probe, and with overall SNR calculated based on reflections from edges of 40 dB. Testing of the probe on an actual storage tank has indicated the capability of the probe to cover about 94 square meters of tested structure including 90° bend and a transition from 15.8 mm to 9.5 mm in wall thickness at 60 kHz. Probes 80 and 90 can be configured for operation at a wide variety of frequency ranges between 20-500 kHz.

Figure 10:
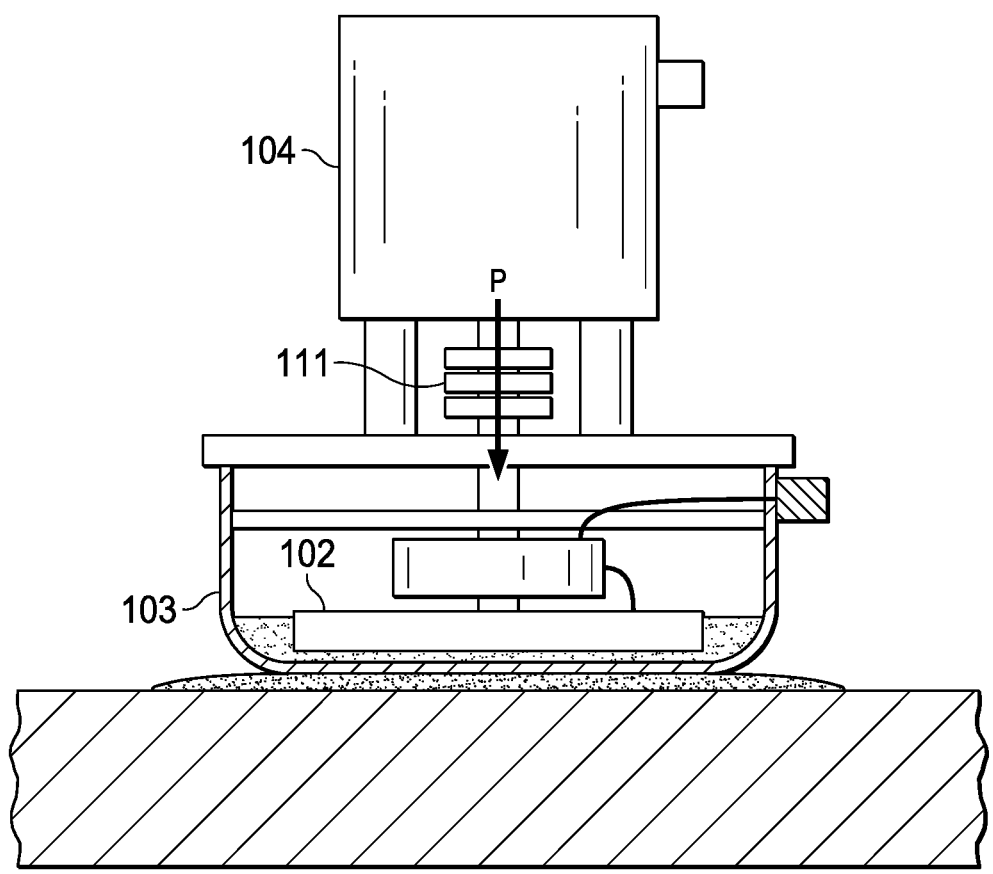
FIG. 10 illustrates a third embodiment of an MsS probe that houses and actuates a rotating MsS plate sensor.

FIG. 10 illustrates a rotating plate MsS probe 100, especially designed for high temperature use. Most elements of probe 100 are similar to those of probe 80, e.g., MsS sensor 102, cup 103, and motor 104. A spring loaded coupling 111 applies pressure to press sensor 102 toward cup 103. Because this axial force opposes sensor rotation, high temperature grease is used inside cup 103 as a couplant. When used on hot surfaces, the outer surface of the probe 100 may be bonded to the test surface using high temperature epoxy.

For some applications, an MsS plate probe, such as probe 80 or 90 or 100, may be permanently attached to a plate structure. This would allow long term structural monitoring with periodic testing.

MsS Testing of Plate Structures

The above-described probe embodiments allow test coverage of a large area of plate from a single probe position in relatively short period of time. During experimentation, 360 A-scans were collected (1 degree probe increments) within about 20 minutes. Multiple data sets may be collected and plotted in the form of B-scan plots, representing the condition of the tested structure around the probe.

Following data collection, the B-scan data may be processed using a processing algorithm known as SAFT. The basic strategy with SAFT is to conceptually divide the structure into a regular grid of virtual locations. The SAFT method processes grid locations separately. For each location considered, the SAFT algorithm calculates the distance from the sensor positions and the target location. This distance is combined with the known velocity of the guided wave to extract the portion of each signal that would correspond with the location being evaluated. This extracted signal portion can be either a single digital value or a small subset of the waveform. Next, the angular separation between the primary radiation direction of each sensor position and target location is computed. This angular value is used to compute the theoretical signal amplitude of a signal coming from the angular direction based on the radiation pattern from the sensor. These correction factors are used to scale each of the extract signal portions from the sensor data. All the data from each sensor is then added together to compute the SAFT response. If an acoustic reflector exists in the plate structure at this location, many of the signals will have an appropriate response and the SAFT result will be large. Conversely, if there is no feature in the structure, the signals will not be coherent and the SAFT result will be small. The result is an increase in the SNR combined with typically better defect localization. This process is repeated for all locations considered to produce a color map image of the plate structure's integrity.

What is claimed is:

1. A probe for use in magnetostrictive guided wave testing of a plate structure, comprising:
    a magnetostrictive sensor;
    wherein the magnetostrictive sensor is a reversed Wiedermann effect sensor, such that it has a magnetostrictive strip, an AC excitation coil wrapped around a short dimension of the strip, and a permanent magnet atop the strip, with poles of the magnet each located along a short side of the strip;
    wherein the magnetostrictive sensor is further a unidirectional sensor with the permanent magnet configured to partially magnetize the magnetostrictive strip and produce wave that travel predominantly in one direction when the sensor is activated atop the plate structure;
    a cup having a flat or nearly flat bottom and raised sides;
    a couplant layer partially filling the cup;
    wherein the sensor is positioned near the bottom of the cup and in the couplant layer;
    wherein the couplant layer is operable to couple ultrasonic energy from the sensor to the cup and to the plate structure when the cup is placed on top of the plate structure, such that ultrasonic waves travel within the plate structure under the cup and radiate outwardly within the plate in a direction parallel to the surface of the plate;
    a shaft attached to the sensor; and
    a motor operable to incrementally rotate the shaft, thereby rotating the sensor within the cup.

2. The probe of claim 1, wherein the couplant layer is a shear wave couplant, and is one of the following materials: shear wave gel, decomposed sugar, wax, liquid polyamides, or high temperature grease.

3. The probe of claim 1, wherein the shaft is centered relative to the sensor.

4. The probe of claim 1, wherein the shaft is offset relative to the sensor.

5. A method of magnetostrictive guided wave testing of a plate structure, comprising:
    placing a magnetostrictive sensor in a cup having a flat or nearly flat bottom and raised sides;
    wherein the magnetostrictive sensor is a reversed Wiedermann effect sensor, such that it has a magnetostrictive strip, an AC excitation coil wrapped around a short dimension of the strip, and a permanent magnet atop the strip, with poles of the magnet each located along a short side of the strip;
    wherein the magnetostrictive sensor is further a unidirectional sensor with the permanent magnet configured to partially magnetize the magnetostrictive strip and produce wave that travel predominantly in one direction when the sensor is activated atop the plate structure;
    attaching a motor shaft to the sensor;
    placing a couplant material on the surface of the plate structure;
    coupling ultrasonic energy from the sensor to the bottom of the cup;
    wherein the coupling step is performed such that ultrasonic energy is transmitted from the sensor to the cup and to the plate structure when the cup is placed on top of the plate structure, and such that ultrasonic waves travel within the plate structure under the cup and radiate outwardly within the plate in a direction parallel to the surface of the plate;
    using a motor to incrementally rotate the shaft, thereby rotating the sensor within the cup;
    at incremental positions of the sensor, delivering guided waves and receiving any signals reflected from defects in the plate structure.

6. The method of claim 5, wherein the coupling step is performed by placing a coupling layer between the sensor and the bottom of the cup.

7. The method of claim 5, wherein the magnetostrictive sensor is a direct Wiedermann effect sensor, and wherein the coupling step is performed by attaching a round magnetostrictive patch to the outer bottom surface of the cup under the sensor or to the plate structure.

8. The method of claim 5, further comprising applying downward pressure to the sensor toward the plate, thereby enhancing acoustic coupling between the sensor and the cup.

* * * * *